Inventors
J. Cleland
C. E. Goldup
C. F. M. Chambers

Patented Sept. 19, 1944

2,358,688

UNITED STATES PATENT OFFICE 2,358,688

TIMBER HAULING VEHICLE AND HOIST

John Cleland, Tunbridge Wells, Cecil Edgar Goldup, Bybrook, Ashford, and Charles Ferris Montagu Chambers, Ashford, England; said Goldup and said Chambers assignors to said Cleland Application March 15, 1944, Serial No. 526,594
In Great Britain January 20, 1943

4 Claims. (Cl. 212—7)

This invention relates to tractors or other vehicles fitted with a winch for hauling timber or other heavy loads and has for its object to devise improvements in the construction and arrangement of such vehicles whereby they may be used as hoists and for a variety of other operations.

The invention consists in a vehicle fitted with a power-driven winch and with a framework carrying a pivoted jib which may be used for lifting loads or for giving an abutment for the winch cable in order to provide for high angle haulage from the rear or from the front of the vehicle.

The invention also consists in a vehicle according to the preceding paragraph in which the framework carrying the jib is removable so that the vehicle may operate purely as a tractor fitted with winch haulage.

Further features of the invention will be apparent from the description given hereafter.

The accompanying drawings illustrate one convenient mode of carrying out the invention.

Figure 1:
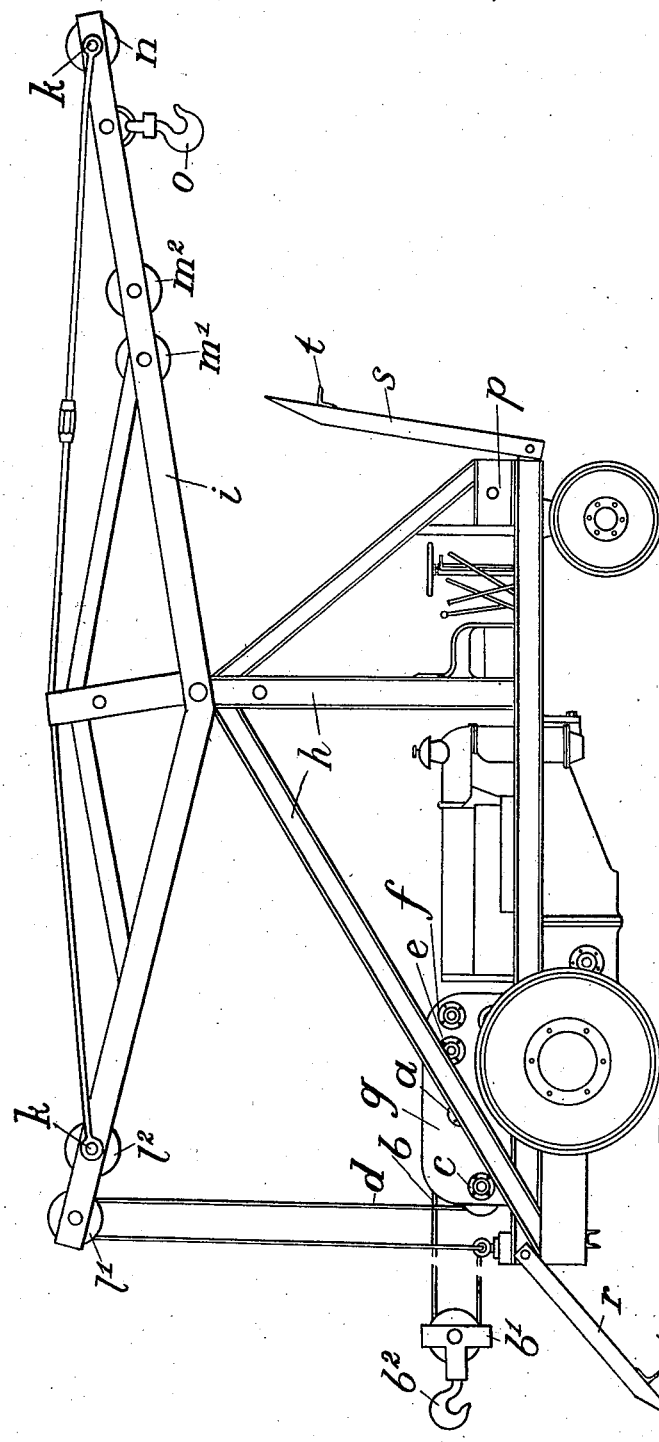

Figure 1 is a side elevation of one convenient form of vehicle in accordance with the invention.

Figures 2 to 5 inclusive are diagrammatic views showing various uses to which the device may be put.

In carrying our invention into effect in one convenient manner as, for example, in its application to a tractor or to a tractor with a modified chassis we fit the tractor with a main winch $a$ of suitable form embodying a drum upon which a length of cable $b$ may be wound and driven from the prime mover of the vehicle or from any other source of power and with an auxiliary winch $c$ upon which the rope or cable $d$ may be wound. The auxiliary winch is also adapted to be driven by the vehicle prime mover and selector clutches $e$, $f$ may be provided to select the appropriate winch for driving.

The winches and their mechanism are preferably located in a box or casing $g$ carried at the rear of the chassis. The chassis carries a triangulated or other suitable framing $h$ involving uprights to which is pivoted a suitable jib or crane arm $i$, the frame being made of channel iron or other suitable units and being, if desired, such that it may be removably carried upon a subchassis or subframe on the tractor so that when the jib frame is completely removed the vehicle may operate purely as a tractor fitted with winch haulage.

The jib arm may be any suitably braced structure as, for example, it may be of somewhat bowed or angular form pivoted to the tractor frame at a point intermediate its length and having tie rods $k$ anchored near the front and rear ends of the arm. The jib carries two pulleys $l$, $l^2$ at its rear end, two pulleys $m'$ and $m^2$ towards the front end, and a pulley $n$ at the front end, and there may also be a lifting hook $o$ (which may be removable) towards the front end of the jib. The cable $d$ from the auxiliary winch $c$ passes round the sheave $l'$ and is used for luffing the jib. There is also conveniently a band or power-operated winch $p$ at the front of the vehicle and a cable $q$ may, when necessary, be passed from this winch round the pulley $m'$ for lowering the front end of the jib and holding it in such lowered position. The vehicle will be provided both at its front and rear ends with suitable sprags or anchors $r$, $s$ by which the vehicle may be anchored against movement in one direction or the other according to the direction of haulage. The sprag arms $r$ at the rear of the vehicle may, if desired, be fitted with angle irons at their upper sides (in addition to the usual angles $t$ on the lower faces) so that when the arms are secured in horizontal position they may be employed for supporting a counterweight or for carrying any desired load.

Figure 2:
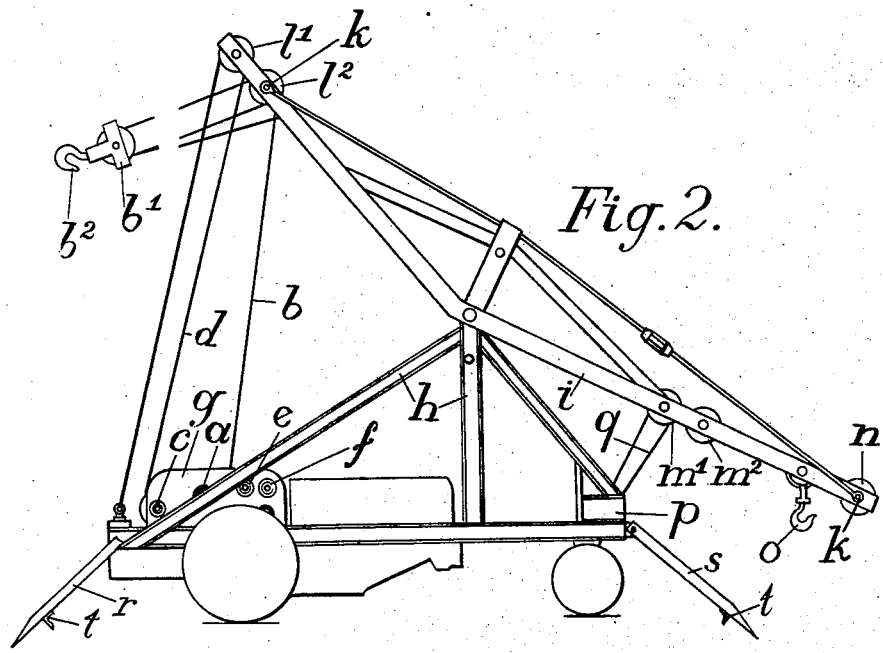
Figure 3:
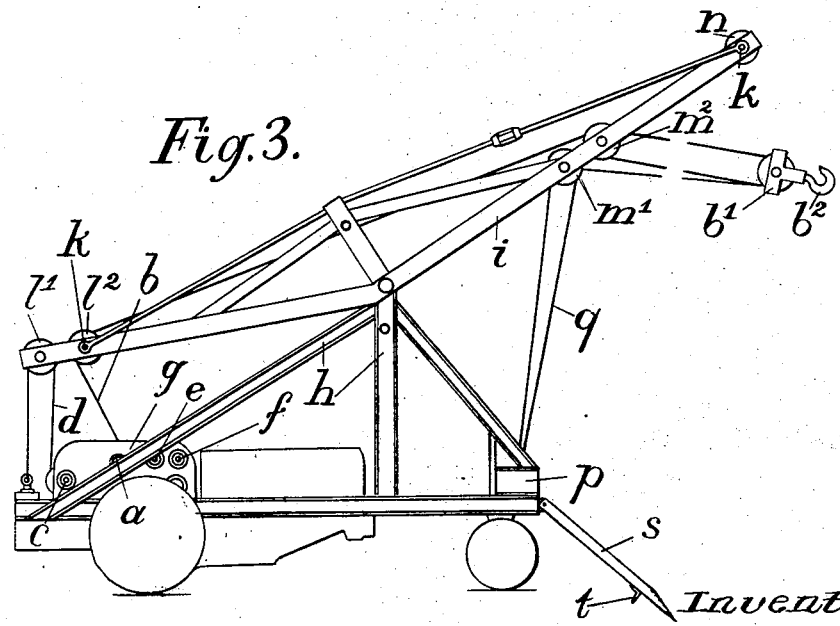
Figure 4:
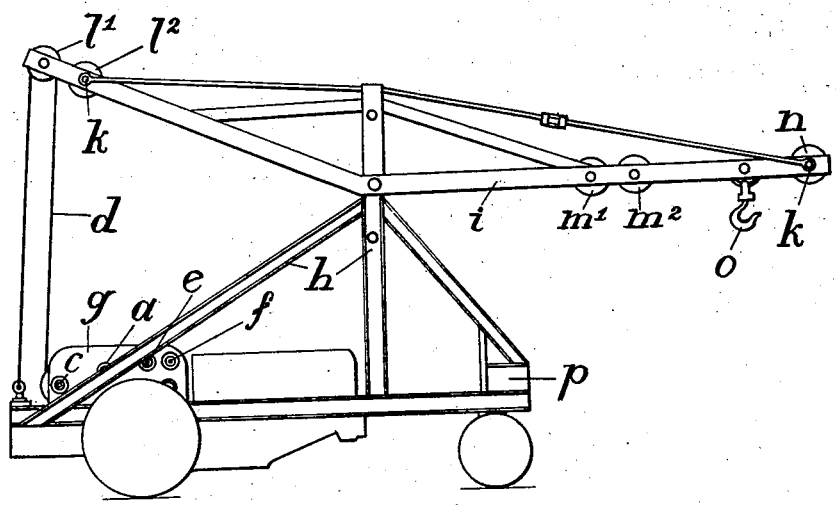

It will be seen from the foregoing description and from the drawings that the device lends itself to a wide variety of uses. Thus in Figure 1 the main cable $b$ (with its block $b'$ and hook $b^2$) is disposed in association with the main winch $a$ for normal hauling of timber or other loads from the rear. In Figure 2 the rear end of the jib has been raised, by operation of the winch $p$, and the main winch cable $b$ is passed round the sheave $l^2$, so that the device is disposed for high angle haulage from the rear. Figure 3 shows the disposition of the parts for high angle haulage from the front of the vehicle. Figure 4 shows the device being used as a portable hoist, the luffing winch $c$ being used for raising and lowering the jib from which the load may be suspended by use of the hook $o$.

Figure 5:
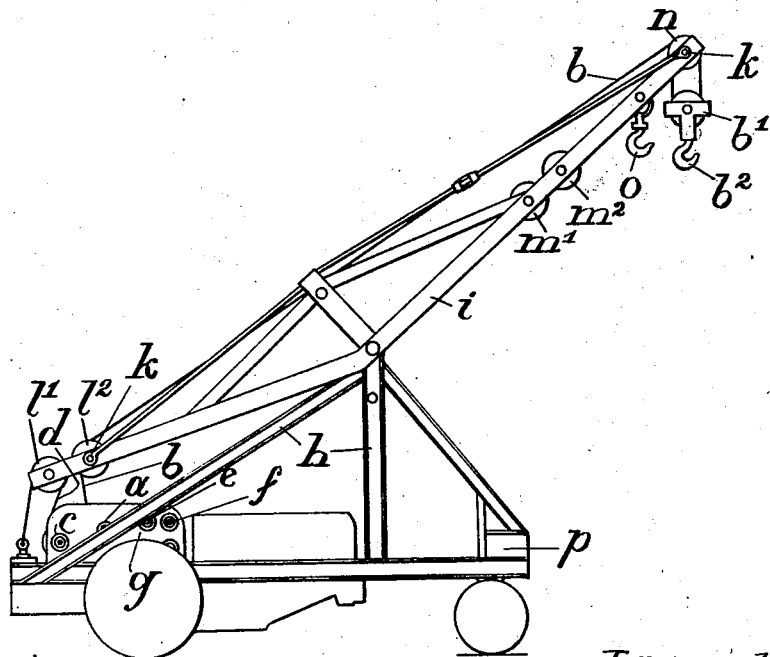

In Figure 5 the main winch cable is shown passing round the sheave $n$ at the extreme front end of the jib which is secured so that its rear end is depressed and its front end elevated then if desired a load can be suspended from the jib hook $o$ while the winch cable is free for other operations. For example, the device may be used over a well or boring or at the dockside or at the edge of a cliff or in any other similar situation in which an operating platform, for example, may be suspended from the hook $o$ on the jib while the winch cable is used for the purpose of lifting and lowering loads from or to the platform.

It will, however, be understood that these uses are given by way of example as many similar uses of the device will suggest themselves to those skilled in the art and in particular, in addition to the haulage of timber or the like, the device will be found of great use in connection with demolition and salvage work, for loading and unloading goods, for shunting empty trucks about, for hauling trailers, or for warping itself out of a boggy or other awkward position.

We claim:

1. In a vehicle, a framework, a pivoted jib carried by said framework, a main winch cable, two sheaves at the rear end jib, one of said sheaves being adapted for luffing and the other sheave for giving an abutment for the main winch cable for high angle haulage from the rear.

2. In a vehicle, a framework, a pivoted jib carried by said framework, a main winch cable, a sheave near the front end of the jib affording an abutment for the main winch cable for high angle haulage from the front, and a sheave at the front end for lifting and lowering loads by the main winch cable.

3. A vehicle as claimed in claim 1 in which there is an auxiliary winch and operating cable at the front of the vehicle passing over a sheave near the front end of the jib for depressing the front end of the jib and holding it in such position.

4. A vehicle as claimed in claim 1 in which an additional sheave is provided at the front end of the jib affording an abutment for the main winch cable for high angle haulage from the front.

JOHN CLELAND.
CECIL EDGAR GOLDUP.
CHARLES FERRIS
MONTAGU CHAMBERS.